United States Patent [19]

Sulser et al.

[11] Patent Number: 5,633,310
[45] Date of Patent: May 27, 1997

[54] WATER-SOLUBLE COPOLYMERS OF VINYLACETATE AND MALEAMIC ACIDS AND USE AS FLUIDIZERS HIGH-RANGE WATER-REDUCERS FOR AQUEOUS SUSPENSIONS

[75] Inventors: Ueli Sulser, Oberengstringen; Anna Huber, Langnau; Jürg Widmer, Zürich, all of Switzerland

[73] Assignee: Sika AG, vorm. Kaspar Winkler & Co., Switzerland

[21] Appl. No.: 174,057

[22] Filed: Dec. 28, 1993

[30] Foreign Application Priority Data

Dec. 28, 1992 [EP] European Pat. Off. ............ 92122027

[51] Int. Cl.$^6$ ............ C08K 3/34; C08L 33/24; C08F 22/38
[52] U.S. Cl. ............ 524/555; 524/542; 524/5; 106/696; 106/727; 106/728; 106/778; 106/790; 252/357; 526/304; 525/502
[58] Field of Search ............ 106/696, 727, 106/728, 778, 790, 724; 252/357; 524/555, 542, 5; 526/304; 525/502

[56] References Cited

U.S. PATENT DOCUMENTS

| | | | |
|---|---|---|---|
| 3,737,333 | 6/1973 | Sawyer, Jr. et al. | 524/447 |
| 3,795,648 | 3/1974 | Samour et al. | 526/304 |
| 3,875,099 | 4/1975 | Kurth et al. | 523/305 |
| 3,956,244 | 5/1976 | Carpenter et al. | 526/326 |
| 5,009,805 | 4/1991 | Perner et al. | 252/173 |
| 5,164,433 | 11/1992 | Ricci et al. | 524/446 |
| 5,331,024 | 7/1994 | Brink et al. | 524/555 |

FOREIGN PATENT DOCUMENTS

| | | | |
|---|---|---|---|
| 0402563A1 | 12/1990 | European Pat. Off. | |
| 1495869 | 11/1969 | Germany | |
| 1939065 | 2/1970 | Germany | 524/555 |
| 1190785 | 5/1970 | United Kingdom | |

OTHER PUBLICATIONS

Derwent Publications Ltd., London, GB, AN 86–065413, Jan., 1986.
Derwent Publications Ltd., London, GB, AN 87–316,481, (Oct. 1987).
Derwent Publications Ltd., London, GB, AN 78–00786A, (Nov. 1977).
Derwent Publications Ltd., London, GB, AN 85–273,695, (Sep. 1985).

*Primary Examiner*—Andrew E. C. Merriam
*Attorney, Agent, or Firm*—Burns, Doane, Swecker & Mathis, L.L.P.

[57] ABSTRACT

Novel water-soluble linear copolymers of vinylacetate with monomeric addition products of amines, amino acids, amino groups containing aromatic sulfonic acids, amino alcohols of maleic anhydride. The copolymers are useful as fluidizers in water containing solid matter suspensions.

17 Claims, No Drawings

WATER-SOLUBLE COPOLYMERS OF VINYLACETATE AND MALEAMIC ACIDS AND USE AS FLUIDIZERS HIGH-RANGE WATER-REDUCERS FOR AQUEOUS SUSPENSIONS

BACKGROUND OF THE INVENTION

The invention relates to novel water soluble polymers, represented by formula (1), which are prepared by polymerizing vinylacetate and maleamic acid or its N-substituted derivatives in presence of a radical producing initiator,

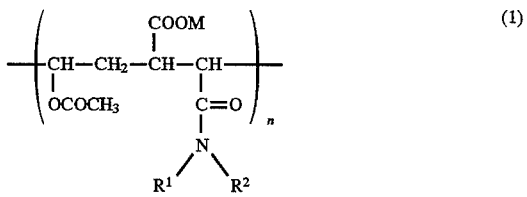

and to novel watersoluble polymers (2) being the hydrolysis-products thereof which are obtained by saponification of the acetate group.

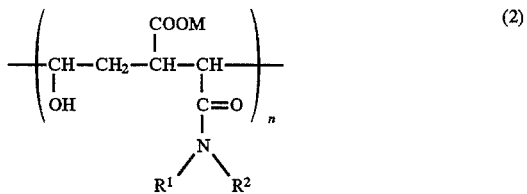

Said N-substituted maleamic acids are the reaction products of maleic anhydride with amines, aminocarboxylic acids, aminogroups—containing aromatic sulfonic acids and amino alcohols at a molar ratio of 1:1.

The invention also relates to the use of said polymers as dispersants and fluidizers for aqueous suspensions.

Dispersants have been commonly used as powerful waterreducers and fluidizers for high solids suspensions, and building or construction materials such as cement and cement mortar. Freshly prepared concrete, for example, is generally considered to be a mixture containing cement, mixing water and the aggregates sand and gravel of distinct particle size distribution. In contrast to concrete, a cement mortar contains no coarse aggregates, but often has a higher cement content.

After mixing, concrete passes several stages of development; i.e., from freshly prepared concrete to solid concrete. These stages may be partly influenced by particular additives.

Concrete additives are added to freshly prepared concrete and freshly prepared mortar and generally dissolved in the mixing water, in order to influence the workability and final characteristics thereof. Depending on the purpose of a building or construction part, as well as any other specific requirements, the characteristics of the concrete will have to be defined by the engineer. The most important characteristic with freshly prepared concrete are the workability, the inner cohesion and its consistency. In the case of solid concrete, the tensile and compressive strengths, resistance to frost, resistance to dew salt, waterproofness, resistance to abrasion and chemical durability are important.

All these characteristics are dependent on the water cement ratio. The water cement ratio:

$w = W/C$;

is obtained from the quantitative ratio of water (W) to cement (C) in freshly mixed concrete. With increasing water content the water cement ratio rises, and with increasing cement content it becomes smaller. A low water cement ratio affords better characteristics of the solid concrete and solid mortar.

On the other hand, a higher water cement ratio provides better workability of freshly prepared concrete. The transfer of freshly prepared concrete from a concrete mixer into the (concrete) form, and the subsequent solidification in the (concrete) form requires a considerable consumption of work and control of work. Therefore, considerable differences in cost may arise depending on the workability of a particular batch.

In order to reduce expenditure on work and cost, concrete mixtures have been made more liquid by adding more mixing water (which increases the water cement ratio). Unfortunately, this has always resulted in reduced strength for the hardened concrete. In recent years so-called fluidizers (also frequently referred to as super plasticizers or high range water reducers) have been increasingly used which allow for an improvement in the consistency of a concrete mixture at a constant water cement ratio.

Polycondensates such as the sodium or calcium salts of sulfonated naphthalene formaldehyde condensates described in U.S. Pat. No. 3,537,869, or salts of sulfonated melamine formaldehyde condensates such as those described in DE-PS 1 671 017, have been used as super plasticizers in order to improve the workability and the time dependent flow behaviour of cement mortars and concrete. These water reducing agents can improve the flowability of such mixtures, but this flowability may not be maintained according to normal practice for a sufficiently long period of time. As a result, additional amounts of water reducing agents have to be added at certain intervals.

Particularly in the transportation of ready mixed concrete, where long ways and delays are inevitable, supplemental dosages of superplasticizers are necessary. However, it is known from experience that only two additional dosages can be used with success and that more dosages are less effective or even may cause retardation of the development of strength.

Water reducing agents have also been used in the production of gypsum building materials such as gypsum board. Gypsum is the generic name for the mineral (hydrous calcium sulfate, $CaSO_4.2H_2O$) variously known as selenite, satin spar, alabaster, rock gypsum, gypsite, etc., and is commonly used to make a form of plaster.

In the production of gypsum sheet materials (e.g., gypsum board which is a gypsum plaster board covered with paper), sheet products are normally fabricated on a high speed machine that automatically spreads a foamy piaster core between sheets of tough surface papers, and cuts the resultant board to proper dimensions. In the past, water reducing agents have been added to plaster solutions to ease processing. These agents have commonly been formaldehyde containing water reducers.

Formaldehyde, unfortunately, is toxic (e.g., by inhalation) and its handling and containment constitutes a tremendous practical problem during the production of gypsum materials. For example, formaldehyde is released in the air when gypsum board is dried.

In order to avoid formaldehyde, other polymer types may be applied, which are synthesized e.g. by radicalic polymerization of ethylenic groups—containing hydrophilic monomers. It is generally known that maleic acid derivatives thereof may be radically copolymerized with an olefinic group containing monomer. Many of these products may be used as water-soluble polymeric dispersing agents. For example, U.S. Pat. No. 3,116,254 describes a copolymer of maleic acid and N-vinylpyrrolidinone and its use as a fluidizer, e.g. for hydraulic cement compositions, which, as compared to sulfonated naphthalene-formaldehyde,—and melamine formaldehyde—polycondenstates, imparts equal flowability and an even better workability. A similar effect is displayed by a copolymer of maleic acid with vinylacetate instead of N-vinylpyrrolidinone as a comonomer, which is described in Japan Patent No. 11,282 (1963). On the other hand, a copolymer of maleamic acid (maleic acid halfamide) and vinylacetate which is claimed in U.S. Pat. No. 3,554,287 shows an unexpected contrary effect on the flowability and causes thixotropy and early stiffening if admixed to fresh concrete samples. Similar copolymers of N-alkyl-substituted maleamic acids and vinylacetate exhibit a high surface tension which is increasing with growing chain length of the N-alkyl side groups. We have inventively found that copolymers which contain $C_1$-$C_4$-alkyl sidegroups can be used as dispersants for cement pastes and concrete to improve flowability and workability but with the disadvantage of an appreciable loss of final compressive strengths of the hardened building material.

In contrast to the copolymers mentioned above, the surface tension of aqueous media containing an inventive copolymer having a hydrophilic funtional group on the side chain is considerably lower. For that reason it was very surprising that the inventive copolymers impart an outstanding high flowability and an unexpected long lasting workability to concrete and that no appreciable retardation of initial setting and early strengths was observed.

SUMMARY OF THE INVENTION

Accordingly, it is a general object of the present invention to provide new water-soluble copolymers. It is also an object to provide new superfluidizers as well as high range water reducing agents useful in building or construction materials such as concretes and mortars and other contexts such as in the manufacture of gypsum board materials.

It is a further object of the invention to provide a water reducing agent which can be used in smaller dosages than conventional water reducing agents. The ability to use smaller dosages can help avoid significant problems such as retardation of development strength in building or construction materials.

It is even a further object of the invention to provide a water reducing agent which can give longer workability times than conventional water reducing agents. This can alleviate common problems with handling, and the problems associated with the common practice of adding additional water reducing agents such as additional labor and its associated cost, as well as the cost of the additional agents themselves. From a safety standpoint, it is also an object ot the invention to provide a water-reducing agent which can be effectively used in the production of gypsum based materials yet does not contain formaldehyde.

Thus, the principal subject of the invention relates to a powerful fluidizer and water reducer for aqueous suspensions of solid matter, preferentially used in the building industry.

The inventive additive is a water soluble copolymer built up of two types of alternating structural units, represented by formula (3) and by formula (4):

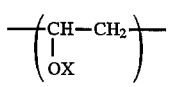 (3)

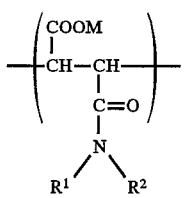 (4)

wherein $R^1$ represent hydrogen, $R^2$ a $C_1$- to $C_{10}$-alkyl residue which may preferably include hydrophilic groups such as alkali metal carboxylate or alkaline earth metal carboxylate groups, an aromatic, aliphatic or cycloaliphatic residue which preferably include sulfonic acid groups or alkali metal sulfonate or alkali earth metal sulfonate groups, a hydroxyalkyl group, preferably a hydroxyethyl or hydroxypropyl group, or may together with the nitrogen atom to which they are bound, form a morpholine ring;

M represents a hydrogen atom, a monovalent or divalent metal ion or a substituted or unsubstituted ammonium group.

X in formula (3) represents a hydrogen atom or the group—CO $CH_3$.

While the invention will be described below in connection with certain preferred embodiments thereof, it will be understood that it is not intended to be limited to those embodiments. To the contrary, it is intended to cover all alternatives, modifications, and equivalents as may be included within the spirit and scope of the invention as defined by the appended claims.

DETAILED DESCRIPTION OF THE PREFERRED EMBODIMENTS

As noted above the copolymers of the invention are useful as dispersing agents. They may be used as dispersing agents in aqueous suspensions of, for example, clay, porcelain muds, chalk, talcum, carbon black, stone powders, pigments, silicates and hydraulic binders.

Also, the copolymers are useful as fluidizers or superplasticizers and high range water reducers for water containing building or construction materials, containing inorganic hydraulic binders such as Portland cement, high alumina cement, blast furnace cement, fly ash cement or magnesia cement, and additives such as sand, gravel, stone powder, fly ash, silica fume, vermiculite, expanded glass, expanded clays, chamotte, light weight additives and inorganic fibers and synthetic fibers, Optionally, the materials can also contain at least one component selected from the group of air entraining agents, concrete plasticizers, super plasticizers for concrete, mortar plasticizers, setting accelerating agents and setting retarding agents. In this context, the invention can provide such high and surprisingly long lasting effects on flowablity, that they may be used effectively in low concentrations thereby avoiding the retardation effects in setting.

It was also quite surprisingly found that some of the copolymers of the invention have a distinct affinity for metal ions, especially alkaline earth metal ions (e.g., calcium ions). Thus, the copolymers of the invention may also be used as complexing agents for those ions.

In a preferred embodiment, the dispersants or fluidizers of the invention are used in powder form or in aqueous solution. In this embodiment the aqueous solution contains the copolymer in an amount ranging from 0.01 to 60% by weight, preferably from 0.01 10–40% by weight.

In the inventive copolymers of vinyl acetate and maleamic acids form strictly alternating chains and may have wide-ranging weight average molecular weights, in the range of 1,000 to 200,000, more preferably from 10,000 to 100,000.

Examples of monomers which can provide structure units represented by Formula (4) include half amides of maleic acid, prepared by the reaction of maleic anhydride with glycine, glutamic acid, alanine, proline, anthranilic acid or by the reaction of maleic anhydride with sulfanilic acid, amino-toluene sulfonic acid, naphthylamine-monosulfonic acid or naphthylamine disulfonic acid and the halfamides obtained by the reaction of maleic anhydride with N-propylamine, N-butylamine, morpholine or amino alkanoles.

Preferred examples of maleamic monomers are represented by the formulas as shown below:

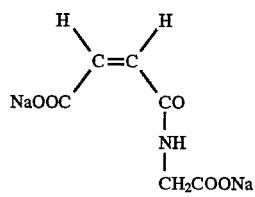

(5)

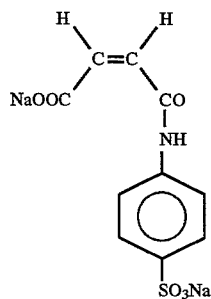

(6)

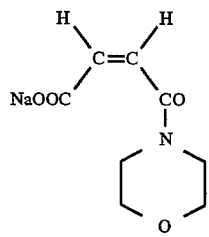

(7)

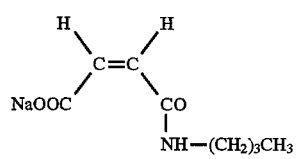

(8)

Following the polymer nomenclature, the inventive copolymers, represented by Formula 1 and 2 can be denoted by poly [(N-subst.-maleamic acid)-co-(vinylacetate)] and salts and poly [(N-subst.-maleamic acid)-co-(vinylalcohol)] and salts respectively.

Preferred inventive copolymers are represented by the following formulas:

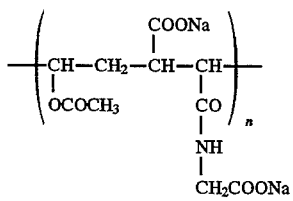

(9)

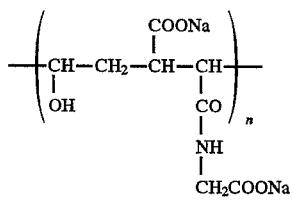

(10)

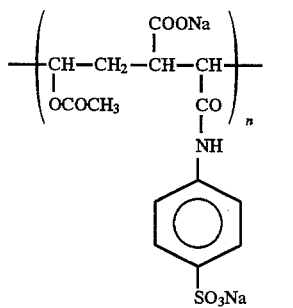

(11)

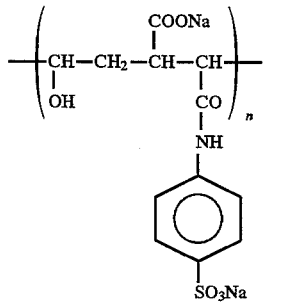

(12)

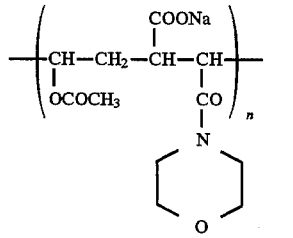

(13)

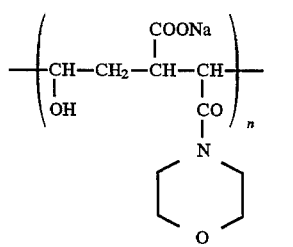

(14)

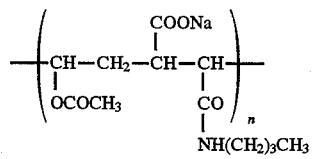

(15)

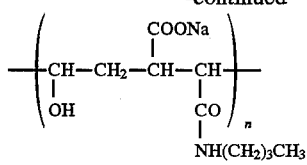

(16)

The inventive polymers are prepared by a peroxide-catalyzed radical chain-copolymerization of vinylacetate (17)

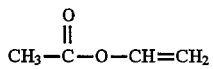

(17)

with maleamic acid salt or an N-substituted derivative thereof. Maleamic monomers, represented by the general Formula 20 are prepared by reaction of maleic anhydride (18) with a preferably hydrophilic, amino compound (19) in aqueous solution at moderate pH values:

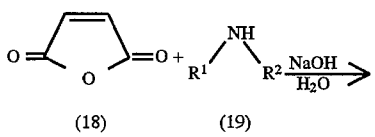

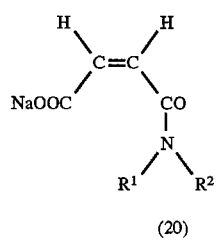

(20)

Vinyl acetate is a monomer of low reactivity toward addition to growing chains in peroxide-catalyzed copolymerization with a second vinylmonomer. Thus, the addition of vinylacetate retards the polymerisation of most other vinyl monomers.

On the other hand, vinyl acetate copolymerizes readily with certain olefinic compounds which alone do not homopolymerize readily, such as maleic acid and maleamic acids. To growing copolymer chains having vinyl acetate at the growing end, almost all other monomers add more readily than vinyl acetate monomers itself. This low reactivity of vinylacetate is responsible for the alternating sequence of the structural units in the copolymer.

The copolymerization is preferably carried out in an aqueous solution containing about 50 mole percent of the salt of a maleamic acid and about 50 mole percent of vinylacetate in the presence of at least one polymerization catalyst combined with a reducing agent to form a redox catalyst system. The reducing agents may be ferrous sulfate, sodium hydroxymethane sulfinate and alkalimetal sulfites and metabisulfites.

The free radical producing catalyst is preferably selected from at least one peroxycompound like hydrogene peroxide or sodium peroxide. The reaction is preferably carried out at a pH ranging from 4,0 to about 7,5 at a temperature of 5° to 120° C., preferably 10°–75° C.

In general, the mixture should be stirred for at least 1 hour at a temperature maintained in the range of 20°–50° C. by cooling until no peroxide may be detected. It should then be neutralized by the addition of a base.

The copolymerization process is characterized by a high yield, a low concentration of residual monomers and a surprisingly high polymerization rate.

Absolute molecular weights of the inventive polymers have not been determined. However, apparent average molecular weights and molecular weight distributions as calculated relative to poly(ethyleneoxide) and poly(styrene sulfonate) standards have been determined using seize-exclusion chromatography.

The following examples illustrate in more detail the preparation of the inventive polymers and their use as additives in cementitious compositions.

EXAMPLE 1 (E-1)

Poly {[4-(carboxymethyl)amino-4 -oxo-2-butenoic acid]-co-[vinylacetate]} sodium salt

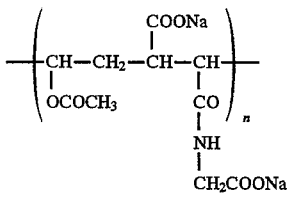

(9)

A solution of the sodium salt of glycine was prepared by adding 53.67 g (0.715 mol) of glycine under stirring to 341.7 g of a 8.3% sodiumhydroxide solution and maintaining the temperature at 30° C. 72.75 g (0.742 mol) of maleic anhydride and 64 g (0.80 mol) of 50% sodium hydroxide was then added simultaneously under stirring and cooling in such a way that the pH was kept within a range of 5.5 to 6.5 and the temperature maintained in the range of 30° to 35° C. After the addition was finished the solution was stirred for another 15 minutes at 30° C. and the pH was adjusted to 6.6–6.8 by adding sodium hydroxide. Then, 150 g of deionized water, 5 g of triethyleneglycol monomethylether, 8 g of amidosulfonic acid, 0.1 g of ferrous sulfate heptahydrate and 16.8 g of 33% hydrogen peroxide was added. After testing pH to be in the range of 4.8–5.2, 58 g (0.674 mol) of vinylacetate was added with vigorous stirring and then dropwise addition of a solution of 8.4 g of Rongalit C (sodium hydroxymethane sulfinate) in 20 g of water was immediately started. The polymerization was carried out for 1 hour whereby the temperature was maintained at 30°–33° C. The reaction product was then cooled to 20° C and neutralized by adding 10 g of sodium metabisulfite and 12 g of 50% sodium hydroxide.

A clear yellow solution of pH 6.5 was obtained having a viscosity of 35 mPa.s and 30% solid matter content. The vinylacetate to maleamic acid ratio in the polymers was 1:1 and the weight average molecular weight was about 17,000.

The original solution (E-1), as described above, was used for comparison tests in examples 13 and 14.

EXAMPLE 2 (E-2)

Poly {[4-(carboxymethyl)amino-4-oxo-2-butenoic acid]-co-[vinylalcohol]} sodium salt

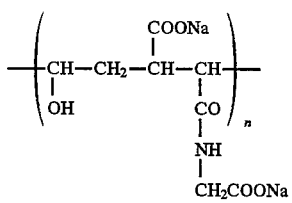

(10)

Polyvinylalcoholes are prepared from polyvinylacetates by replacement of acetate groups by hydroxyl groups.

Thus, to 100 g of solution (E-1) of example 1 there was added with agitation 10 g of 50% sodium hydroxide. The mixture was then heated to 80° C. and stirred for 10 hours. A 95% degree of saponification was determined by acidimetric titration. After cooling to 20° C. the solution was neutralized by the careful addition of concentrated sulfuric acid.

A polymer of the following properties was obtained:

| | |
|---|---|
| pH: | 7.2 |
| Viscosity (20° C.) | mPa · s (Brookfield) |
| Polymer content | 25% |
| $M_w$ | 15'000 |

The original solution (E-2), as described above, was used for comparison tests in examples 13 and 14.

EXAMPLE 3 (E-3)

Poly {[4-(sulphophenyl) amino-4-oxo-2-butenoic acid]-co-[vinylacetate]} sodium salt

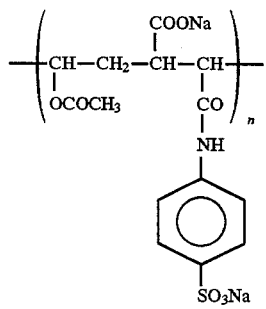

(11)

A solution of sodium sulfanilate was prepared by adding with vigorous agitation 122.5 g (707 mol) of sulfanilic acid to a mixture of 56.7 g 50% sodium hydroxide and 0.017 g tribulylphophate in 444 g water.

The reaction mixture was then cooled to 28° C. and 72.75 g (0.742 mol) of maleic anhydride and 64 g (0.80 mol) of 50% sodium hydroxide are added simultaneously under stirring and cooling in such a way that the pH value was kept within a range of 5.5 to 6.5 and the temperature maintained in the range of 30 to 40° C. After die addition was finished, the solution was stirred for another 15 minutes at 30° C. and the pH was adjusted to 6.6 to 6.8 by adding a few drops of 50% sodium hydroxide. Then, 150 g of deionized water, 5 g of triethyleneglycol-monomethylether, 8 g of amidosulfonic acid, 0.1 g of ferrous sulfate heptahydrate and 16.8 g of 33% hydrogenperoxide was added. After testing the pH to be in the range of 4.8–5.2, 58 g (0.674 mol) of vinylacetate was added with vigorous stirring and then dropwise addition of 8.4 g Rongalit C (sodium hydroxymethane sulfinate) in 20 g of water was immediately started. The addition was finished after 1 hour and the temperature maintained at 30–33° C. After cooling to 20° C. the solution was neutralized by adding 12 g 50% sodium hydroxide and 10 g of sodium metabisulfite.

A clear brown 30%-solution of pH 6.5 was obtained, having a viscosity of 45 mPa.s which corresponds to an average weight of about 27,000. The polymer content was determinded by HPLC analyses to be 28% (93,5% of solids content).

The original solution (E-3), as described above, was used for comparison tests in examples 13 and 14.

EXAMPLE 4 (E-4)

Poly {[4-(4 sulfophenyl)amino-4-oxo-2-butenoic acid]-co-[vinylalcohol]} sodium salt

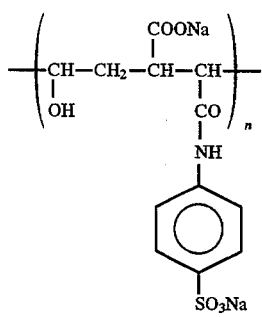

(12)

To 100 g of solution (E-3) of example 3 there was added 10 g fo 50% sodium hydroxide and the resulting solution then heated to 80° C. and stirred for 12 hours. A 96% degree of saponification was determined by acidimetric titration. The solution was then cooled down to 20° C. and neutralized by slowly adding concentrated sulfuric acid.

A polymer solution of the following properties was obtained

| | |
|---|---|
| pH = 7.0 | Viscosity 61 mPa · s (Brookfield) |
| Solids content = 25% | $M_w$ = 25600 |

The original solution (E-4), as described above, was used for comparison tests in examples 13 and 14.

EXAMPLE 5 (E-5)

Poly [(4-morpholino-4-oxo-2-butenoic acid)-co-(vinylacetate)] sodium salt (13)

A solution of 61.6 g (0,707 mol) of morpholine in 340 g of water was adjusted to a pH-range of 7.5–8.0 by adding dropwise 90% formic acid. 72,75 (0,742 mol) of maleic anhydride and 64 g (0.80 mol) of 50% sodium hydroxide were then added simultaneously under stirring and cooling with ice in such a way that the pH value was kept within a range of 5.5 to 6.5 and the temperature maintained in the range of 30°–35° C. After the addition was finished stirring was continued for another 15 minutes at 30° C. and the pH was adjusted to 6.6–68 by adding 50% sodium hydroxide. Then, 150 g of deionized water, 5 g of triethyleneglycol monomethylether, 8 g of amidosulfonic acid, 0.1 g of ferrous sulfate heptyhydrate and 16.8 g of 33% hydrogenperoxide was added. After testing the pH to be in the range of 4.8–5.2, 58 g (0.674 mol) of vinylacetate was added with vigorous stirring and then dropwise addition of a solution of 8.4 g of Rongalit C (sodiumhydroxymethane sulfinate) in 20 g water was immediately started. The addition was finished after 1 hour whereby the temperature was maintained in the range of 30°–33° C. After cooling to 20° C. the solution was neutralized by adding 10 g of sodium metabisulfite and 12 g of 50% sodium hydroxide.

A clear, slightly yellow solution of 30% solids content was obtained. The viscosity of the solution was 30 mPa.s and the weight average molecular weight was found to be 19,000.

The original solution (E-5), as described above, was used for comparison tests in examples 13 and 14.

EXAMPLE 6 (E-6)

Poly [(4-morpholino-4-oxo-2-butenoic acid)co-(vinylalcohol)] sodium salt

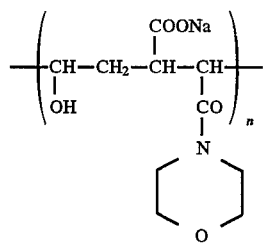
(14)

To 100 g of solution (E-5) there was added 10 g of 50% sodium hydroxide. The resulting solution was then heated to 80° C. and stirred for 10 hours. A 93% degree of saponification was determined by acidimetric titration. The solution was then cooled down to 20° C. and neutralized by adding carefully and dropwise concentrated sulfuric acid.

A nearly colourless polymer solution of 25% solids content and viscosity of 51 mPa.s (Brookfield) was obtained. $M_w=18,000$.

EXAMPLE 7 (E-7)

Poly [(4-butylamino-4-oxo-2-butenoic acid)co - (vinylacetate)] sodium salt

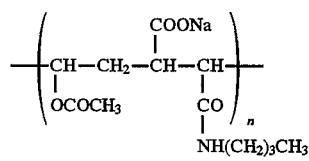
(15)

A solution of 52.6 g (0.72 mol) of n-butylamine and 0.02 g tributylphosphate in 319 g of deionized water was adjusted to pH of 8–8.5 by adding dropwise 90% formic acid. 72.75 g (0.742 mol) of maleic anhydride and 64 g (0.80 mol) of 50% sodium hydroxide was then added simultaneously under vigorous agitation and ice-cooling in such a way that the pH value was kept within a range of 5.5–6.5 and the temperature maintained in the range of 30°–35° C.

After the addition was finished, stirring was continued for another 15 minutes at 30° C. and the pH was adjusted to 6.6–6.8 by adding 50% sodium hydroxide. Then, 150 g of deionized water, 5 g of triethyleneglycol monomethylether, 8 g of amidosulfonic acid, 0.1 g of ferrous sulfate heptahydrate and 16.8 g of 33% hydrogen peroxide was added. After testing the pH to be in the range of 4.8 to 5.2, 6026 g (0.70 mol) of vinylacetate was added with vigorous stirring and then, dropwise addition of a solution of 8.4 g of Rongalit C (sodium hydroxymethane sulfinate) in 20 g water was immediately started. The polymerization was carried out for 1 hour keeping the temperature in the range of 30°–35° C.

The reaction solution was then cooled to 20° C. and neutralized by adding 10 g of sodium metabisulfite and 12 g of 50% sodium hydroxide.

A clear, slightly yellow solution of 30% solids content and a viscosity (Brookfield) of 225 mPa.s was obtained. The weight average—molecular weight was found to be 22,000.

The original solution (E-7) as described above was used for comparison tests in examples 13 and 14.

EXAMPLE 8 (E-8)

Poly [(4-butylamino-4-oxo-2-butenoic acid) co-(vinylalcohol)]sodium salt

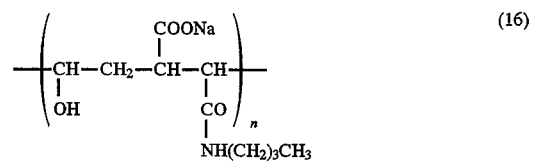
(16)

To 100 g of solution (E-7) there was added 10 g of 50% sodium hydroxide. The resulting solution was then heated to 80° C. and stirred for 10 hours. A 96% degree of saponification was determined by acidimetric titration.

The solution was cooled down to 20° C. and neutralized by the careful and dropwise addition of concentrated sulfuric acid.

A slighlty yellow polymer solution of 25% solids content and a viscosity of 255 mPa.s was obtained. $M_w=20,500$.

EXAMPLE 9 (R-1)

A reference copolymer (R-1), Poly [(maleic acid)-co-(vinylacetate)] sodium salt, denoted by Formula (21):

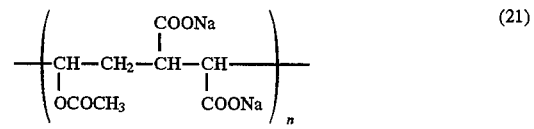
(21)

was obtained by copolymerization of vinylacetate with maleic acid-disodium salt according to K. Hattori, Japan 11,282 (1963). The copolymer had an average molecular weight of 5,000.

EXAMPLE 10 (R-2)

A reference copolymer solution (R-2), of Poly [(maleic acid)-co-(vinylalcohol)] sodium salt, represented by Formula (22):

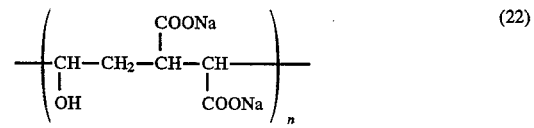
(22)

was obtained by saponification of the copolymer (21).

EXAMPLE 11 (R-3)

"MELMENT F-10", a commercially available dispersing agent for hydraulic cement masses, which is a sodium salt of sulfonated melamine-formaldehyde polycondensate, of an average weight-molecular weight of about 10,000 was used as reference polymer solution (R-3).

EXAMPLE 12 (R-4),

"LOMAR-D", a commercially available dispersing agent for hydraulic cement masses which is a sodium salt of a sulfonated naphthalene-formaldehyde polycondensate of weight-average molecular weight 4,000, was obtained as reference polymer solution (R-4)

EXAMPLE 13

This example was conducted to demonstate the improved dispersing effect of the inventive polymers on cement pastes. The polymer solutions E-1 to E-7 were tested in different dosages. Reference polymers R-1, R-3 and R-4 were also tested and compared in this context.

According to this example, a rotational viscosimetric determination was used to test the dispersing effect of the copolymers. A Brabender viscocorder, Type No. 8018 was used.

The solid matter to be dispersed (Portland cement) was weighed in a Hobart mixer (vessel volume about 4 liters). Under stirring, a dilute aqueous solution of the additive to be tested was added. Simultaneously, a stop watch was started.

At 10 to 15 minutes after the addition of the solution, the moment of rotation, which is directly proportional to the viscosity of the suspension, was observed from the rotation viscosimeter. The flow effect of a despersing agent improves as the shear resistance decreases, measured as the moment of rotation, which is exerted by the suspension on the measuring paddle.

Test conditions:

| | |
|---|---|
| Cement | Portland cement 35 F. |
| Water cement value: | % by weight of solid polymer, referred to cement |
| Shear head: | cement paddle |
| Rotation rate: | 120 rpm |

The results of this test were quite unexpected in that the polymers according to the invention provided a superior dispersing effect. For example, the results of Table 1 demonstrate that in order to get the same fluidity (a lwo shear resistance in the range of 180 to 220 g.cm), it was necessary to use the double dosage of reference polymers (0.4%) compared to inventive dispersants.

TABLE 1

Dispersing effect of various polymers in Portland cement pastes

| Mixt. No. | Polymer solution | Dosage % solid matter | Shear resistance [g · cm] after 10' | after 15' |
|---|---|---|---|---|
| 1 | without | — | 520 | 530 |
| 2 | E-1 | 0.2 | 200 | 220 |
|   |     | 0.1 | 260 | 280 |
| 3 | E-2 | 0.2 | 210 | 230 |
|   |     | 0.1 | 280 | 280 |
| 4 | E-3 | 0.2 | 190 | 190 |
|   |     | 0.1 | 250 | 250 |
| 5 | E-4 | 0.2 | 205 | 220 |
|   |     | 0.1 | 260 | 280 |
| 6 | E-5 | 0.2 | 210 | 220 |
|   |     | 0.1 | 270 | 270 |
| 7 | E-7 | 0.2 | 250 | 250 |
|   |     | 0.1 | 350 | 350 |
| 8 | R-1 | 0.4 | 190 | 190 |
|   |     | 0.2 | 295 | 300 |
|   |     | 0.1 | 385 | 390 |
| 9 | R-3 | 0.4 | 210 | 190 |
|   |     | 0.2 | 290 | 295 |
|   |     | 0.1 | 350 | 340 |
| 10 | R-4 | 0.4 | 210 | 210 |
|    |     | 0.2 | 250 | 250 |
|    |     | 0.1 | 370 | 380 |

EXAMPLE 14

This example demonstrates the improved fluidizing effect of the polymers of the invention. The polymers prepared according to Examples 1–7 were tested as fluidizers and water reducers in cement mortar and concrete. Those comparative polymers described in Examples 9–12 were also tested and compared in this context.

The consistency of freshly prepared concrete or freshly prepared mortar, i.e., the mobility or viscosity of the freshly prepared mixture, is the most important characteristic of workability. For measuring the consistency of concrete and mortar, a flwo table spread is used in industry. Sometimes the "slump test" (setting value) according to ASTM C143 is also used.

For purposes of this experiment the flow table spread was determined by putting concrete into an iron form on a two-part table (70×70 cm). By removing the form, a concrete body having a truncated cone shape is prepared. Then the area of the table is lifted on one side for 4 cm, and allowed to fall. This procedure is carried out 15 times, and the concrete spreads. The average diameter of the formed cake corresponds to the flow table spread.

For the slump test, three layers of concrete are put into a mold having a shape of a truncated cone and having certain dimensions, and compressed with 25 pushes of an iron bar. At the top, the concrete is stripped off evenly. Then, the form is vertically removed. The concrete body will sink in by itself. The slump is measured by determining the vertical difference between the top of the mold and the displaced original center of the top surface of the test sample.

In order to compare the obtained test results and to bring them into a relation with the consistency, the freshly prepared concrete may be divided into consistency ranges:

| Consistency Ranges of Freshly Prepared Concrete | | |
|---|---|---|
| Denotation | Flow Table Spread (cm) | Slump (cm) |
| K1 rigid | >30 | >1 |
| K2 semi-plastic | 30 to 40 | 1 to 9 |
| K3 plastic | 41 to 50 | 10 to 15 |
| K4 fluid | >51 | >16 |

Fluidizers are used when specific construction applications are necessary. Flow concrete is used when high inserting rates (e.g., from 50 to 100 $m^3$/hour) are required, or when the form and reinforcement of a construction part do not allow a compression of the concrete vy vibration due to some technical reason. Concretes having K2 and K3 consistencies may be prepared from a concrete of K1 consistency by adding fluidizers, when increased mechanical strength at an equal remaining workability shall be obtained. For certain freshly prepared concretes, the effect is dependent on the dosage. Usually, from 0.2 to 1.5% solid matter quantities (in dissolved form), referred to the weight of cement, are added.

To a high degree, the effect is also dependent on the chemical structure of the polymer, which is the basis of the fluidizer.

In order to demonstrate the increased effectiveness of the fluidizers of the invention, the flow behaviour of concrete mixtures containing the fluidizers described in Examples 1–7 was measured in accordance with DIN 1048, Part 1, and ASTM C143. As a comparison, those polymers described in Examples 9–12 were also examined.

The cement and the aggregates were premixed for 15 seconds in a 50 liter forced circulation mixer for concrete. Then the mixing water or the fluidizer, distributed in the mixing water, was added slowly under stirring over 15 to 20 seconds. Then the mixture was stirred in a wet state for an additional 60 seconds. A part of the mixture was then immediately filled into the mold for determination of the flow table spread and the slump.

Immediately after measuring the flow table spread, test bodies having edge lengths of 12×12 cm were prepared, and the compressive strength was measured after 1, 7 and 28 days in accordance with DIN 1048, Part 1. The determination of initial setting was carried out in accordance with ASTM C403.

| Composition of the Concrete Mixtures | |
|---|---|
| Components | Amount |
| Netstal filler (chalk filler) | 1.5 kg |
| Rhine sand Epple up to 1.2 mm | 9.5 kg |
| Rhine sand Epple 1.2 to 4 mm | 8.0 kg |
| Rhine sand Epple 4 to 8 mm | 4.5 kg |
| Mine gravel* 8 to 16 mm | 11.5 kg |
| Mine gravel* 16 to 32 mm | 15.0 kg |
| Portland cement | 7.5 kg |
| Mixing water | variable, depending on the water cement ratio |
| Fluidizer | variable, dissolved in the mixing water |

*washed and dried

TABLE 2

Time-dependent behaviour of flow-concrete containing different polymers
Flowtable spread according do DIN 1048.1; setting value (slump) according to ASTM-C143. Temperature: 20° C.

| Mix. No. | Polymer-solution | Dosage % solids | W/C = 0.55 | Flow table spread/slump in cm, x minutes after mixing | | | | | | | |
|---|---|---|---|---|---|---|---|---|---|---|---|
| | | | | x = 0 | 15 | 30 | 45 | 60 | 90 | 120 | 150 |
| 1 | Control | — | | 43/10 | 43/10 | 42/6 | 42/5 | 41/3 | 35/3 | 30/1 | — |
| 2 | E-1* | 0.24 | | 61/25 | 62/23 | 60/22 | 60/21 | 60/20 | 58/20 | 56/18 | 51/17 |
| | | 0.12 | | 56/23 | 55/20 | 54/20 | 51/19 | 48/18 | 47/16 | 39/12 | 35/7 |
| 3 | E-2* | 0.24 | | 62/23 | 63/23 | 62/23 | 61/21 | 60/21 | 60/21 | 58/20 | 53/18 |
| | | 0.12 | | 58/22 | 52/22 | 51/21 | 50/20 | 48/19 | 46/17 | 40/15 | 36/10 |
| 4 | E-3* | 0.24 | | 63/25 | 64/24 | 63/23 | 62/22 | 61/21 | 60/21 | 59/20 | 56/19 |
| | | 0.12 | | 59/22 | 56/21 | 55/20 | 51/19 | 50/18 | 47/17 | 41/16 | 37/11 |
| 5 | E-4* | 0.24 | | 61/24 | 61/23 | 60/21 | 59/19 | 57/17 | 57/15 | 55/15 | 50/14 |
| | | 0.12 | | 55/20 | 55/18 | 54/17 | 51/15 | 50/15 | 50/13 | 45/10 | 33/6 |
| 6 | E-5* | 0.24 | | 58/21 | 58/20 | 57/20 | 56/20 | 55/16 | 55/15 | 55/14 | 51/13 |
| | | 0.12 | | 53/20 | 52/20 | 50/19 | 50/17 | 48/16 | 48/15 | 41/10 | 32/2 |
| 7 | E-7* | 0.24 | | 54/15 | 54/15 | 50/13 | 49/12 | 50/11 | 47/10 | 45/9 | 41/5 |
| | | 0.12 | | 51/13 | 50/12 | 50/10 | 47/9 | 45/7 | 41/5 | 40/5 | 30/3 |
| 8 | R-1** | 0.24 | | 55/13 | 51/13 | 50/10 | 47/8 | 45/7 | 40/4 | 37/3 | 30/1 |
| | | 0.12 | | 50/10 | 50/8 | 47/7 | 45/6 | 41/3 | 37/3 | — | — |
| 9 | R-3** | 0.41 | | 59/22 | 53/21 | 53/19 | 50/18 | 48/16 | 46/15 | 40/12 | — |
| | | 0.24 | | 50/10 | 49/9 | 47/6 | 44/5 | 41/3 | 32/1 | — | — |
| 10 | R-4** | 0.48 | | 58/21 | 51/20 | 50/15 | 45/10 | 40/7 | 37/3 | 33/1 | — |
| | | 0.24 | | 51/15 | 48/12 | 47/6 | 43/6 | 35/4 | 32/1 | — | — |

*Inventive polymers
**Reference polymers

TABLE 3

Time-dependent stiffening behaviour of concrete containing different polymers.
Flowtable spread according do DIN 1048.1; setting value (slump) according to ASTM-C143. Temperature: 20° C.

| Mix. No. | Polymer-solution | Dosage % solids | W/C = 0.48 | Flow table spread/slump in cm, x minutes after mixing | | | | | | | |
|---|---|---|---|---|---|---|---|---|---|---|---|
| | | | | x = 0 | 15 | 30 | 45 | 60 | 90 | 120 | 150 |
| 1 | Control | — | | 32/3 | 31/2 | 30/2 | 30/1 | — | — | — | — |
| 2 | E-1* | 0.24 | | 60/21 | 60/20 | 59/20 | 57/19 | 52/19 | 50/18 | 50/18 | 47/14 |
| | | 0.12 | | 54/18 | 50/15 | 48/15 | 43/11 | 40/10 | 38/9 | 33/8 | — |
| 3 | E-2* | 0.24 | | 58/20 | 57/19 | 55/19 | 52/18 | 50/17 | 46/14 | 35/11 | — |
| | | 0.12 | | 46/15 | 45/15 | 41/12 | 39/10 | 37/4 | 36/2 | — | — |
| 4 | E-3* | 0.24 | | 61/22 | 61/21 | 60/21 | 58/20 | 53/19 | 51/19 | 51/18 | 48/15 |
| | | 0.12 | | 55/18 | 50/15 | 49/15 | 44/12 | 41/11 | 39/10 | 34/8 | — |
| 5 | E-4* | 0.24 | | 56/20 | 56/19 | 55/19 | 53/16 | 48/16 | 46/15 | 56/13 | 43/12 |
| | | 0.12 | | 50/17 | 50/16 | 49/16 | 47/13 | 42/12 | 38/12 | — | — |
| 6 | E-5* | 0.24 | | 58/19 | 58/18 | 57/18 | 55/17 | 50/17 | 48/16 | 47/1 | 39/11 |
| | | 0.12 | | 52/17 | 52/16 | 51/16 | 49/15 | 44/15 | 42/13 | 39/12 | — |
| 7 | E-7* | 0.24 | | 57/19 | 57/18 | 56/17 | 56/16 | 49/16 | 47/14 | 46/13 | 36/10 |
| | | 0.12 | | 51/17 | 51/16 | 50/15 | 50/14 | 43/14 | 41/12 | — | — |
| 8 | R-1** | 0.24 | | 53/17 | 53/16 | 52/16 | 50/15 | 45/14 | 43/12 | 31/3 | — |
| | | 0.12 | | 47/15 | 47/14 | 46/13 | 44/12 | 39/10 | — | — | — |
| 9 | R-3** | 0.48 | | 60/21 | 60/20 | 59/20 | 55/18 | 51/17 | 49/16 | 45/16 | — |
| | | 0.24 | | 43/17 | 42/16 | 40/14 | 37/12 | 35/10 | 31/4 | 30/1 | — |

TABLE 3-continued

Time-dependent stiffening behaviour of concrete containing different polymers.
Flowtable spread according do DIN 1048.1; setting value (slump) according to ASTM-C143. Temperature: 20° C.

| Mix. No. | Polymer-solution | Dosage % solids | W/C = 0.48 | x = 0 | 15 | 30 | 45 | 60 | 90 | 120 | 150 |
|---|---|---|---|---|---|---|---|---|---|---|---|
| 10 | R-4** | 0.48 | | 59/20 | 51/19 | 50/15 | 48/12 | 46/11 | 40/9 | 37/3 | — |
|  |  | 0.24 | | 45/17 | 43/16 | 41/15 | 38/9 | 35/9 | 30/1 | — | — |

*Inventive Polymers;
**Reference polymers

TABLE 4

Initial setting according to ASTM-C403, flowtable spread and compressiv
strength according to DIN 1048.1 of concrete. containing different polymers

| Mixture-No. | 1 | 2 | 3 | 4 | 5 | 6 | 7 | 8 | 9 | 10 |
|---|---|---|---|---|---|---|---|---|---|---|
| Designation of polymer solution | Ctrl. | E-1* | E-2* | E-3* | E-4* | E-5* | E-7* | R-1** | R-3** | R-4** |
| Dosage % solid matter | — | 0.24 | 0.24 | 0.24 | 0.24 | 0.24 | 0.24 | 0.24 | 0.48 | 0.48 |
| W/C | 0.48 | 0.48 | 0.48 | 0.48 | 0.48 | 0.48 | 0.48 | 0.48 | 0.49 | 0.48 |
| Initial setting/h after mixing | 3 | 8.5 | 10.5 | 6.5 | 8.5 | 6 | 5.5 | 9 | 3.5 | 3.75 |
| Flow table spread in cm | 32 | 60 | 58 | 61 | 56 | 58 | 57 | 53 | 60 | 59 |
| Compressive strength |  |  |  |  |  |  |  |  |  |  |
| (N/mm²) after    1d | 21.5 | 18 | 13.2 | 21.4 | 18.5 | 21 | 17.3 | 16.1 | 24.5 | 24.1 |
| 7d | 40 | 37.2 | 32.7 | 41.3 | 38 | 42.5 | 37.1 | 39 | 40.2 | 42.6 |
| 28d | 43.8 | 45.6 | 39.7 | 46.5 | 46 | 45.9 | 41.2 | 43.7 | 48.1 | 47.3 |

*Inventive polymers
**Reference polymers

What is claimed is:

1. A dispersing agent or fluidizer for aqueous suspensions of an effective dispersing or fluidizing amount of a substantially water soluble linear copolymer of monomeric units selected from vinyl acetate and vinyl alcohol with monomeric units of N-substituted maleamic acids in a molar ratio of 1:1, said copolymer represented by Formula (A)

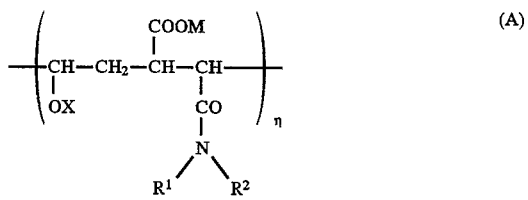

wherein $R^1$ is hydrogen, $R^2$ is an unsubstituted C1 to C4-alkyl residue, a C1 to C10-alkyl residue which comprises an alkali metal carboxylate or alkaline earth metal carboxylate group, or a hydroxy or amino group, an aromatic residue which comprises carboxylic acid or sulfonic acid groups or alkali metal carboxylate or sulfonate or alkaline earth metal carboxylate or sulfonate groups, or may together with the nitrogen atom to which they bond, form a morpholine ring; X represents a hydrogen atom or the group—$COCH_3$; and M represents a hydrogen atom, a monovalent or divalent metal ion, or a substituted or unsubstituted ammonium group.

2. A dispersing agent according to claim 1, said dispersant being a copolymer having a weight average molecular weight in the range of 1,000–2,000.

3. An aqueous solution comprising an effective dispersing or fluidizing amount of the copolymer set forth in claim 1.

4. The aqueous solution according to claim 3, said solution containing the copolymer in an amount ranging from 0.01 to 60% by weight.

5. An aqueous suspension comprising solid matter and a dispersing agent according to claim 1 in an amount in the range from 0.01 to 10%.

6. An aqueous suspension according to claim 5, wherein the solid matter comprises at least one member selected from the group of clays, porcelain muds, chalk, talkum, carbon black, stone powders, pigments, silicates and hydraulic binders.

7. An aqueous suspension according to claim 5 wherein the solid matter comprises a hydraulic binder selected from a least one of Portland cement, high alumina cement, blast furnace cement, puzzolane cement, fly ash cement or white cement.

8. An aqueous suspension according to claim 5, further comprising at least one of the group of sand, gravel, stone powder, fly ash, silica fume, vermiculite, expanded glass, expanded clays, chamotte, inorganic fibers and synthetic organic fibers.

9. An aqueous suspension according to claim 5, wherein the solid matter comprises anhydrous calcium sulfate and/or calcium sulfate hemihydrate and/or calcium sulfate dihydrate.

10. An aqueous suspension according to claim 5, further comprising at least one additive based on ligno sulfonates, sulfonated melamine-aldehyde polycondensates, sulfonated naphthalene-formaldehyde polycondensates, phosphonic acids and derivatives thereof.

11. An aqueous suspension according to claim 5, further comprising silica fume.

12. An aqueous suspension according to claim 5, further comprising a sulfonated naphthalene-formaldehyde condensate additive.

13. An aqueous suspension comprising (i) at least one member selected from the group of clays, porcelain, muds, chalk, talcum, carbon black, stone powders, pigments, silicates, gypsum plaster and hydraulic binders, and (ii) a dispersing or fluidizing amount of a substantially water soluble linear copolymer of monomeric units selected from vinyl acetate and vinyl alcohol with monomeric units of N-substituted maleamic acids in a molar ratio of 1:1, said copolymer represented by formula (A) as follows:

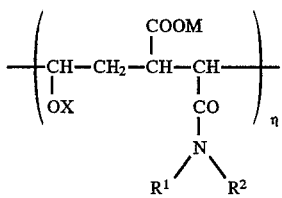
(A)

wherein $R_1$ represents hydrogen; $R_2$ represents a C1 to C10-alkyl residue which may optionally comprise an alkali metal carboxylate or alkaline earth metal carboxylate group, or a hydroxy or amino group, an aromatic residue, a cycloaliphatic ring system which may optionally comprise carboxylic acid or sulfonic acid groups or alkali metal carboxylate or sulfonate or alkaline earth metal carboxylate or sulfonate groups, hydroxyethyl or hydroxy propyl groups, or may together with the nitrogen atom to which they bond, form a morpholine ring; X represents a hydrogen atom or the group —$COCH_3$; and M represents hydrogen, a monovalent or divalent metal ion, or a substituted or unsubstituted ammonium group.

14. An aqueous suspension according to claim 13, component (i) comprising a hydraulic binder.

15. An aqueous suspension according to claim 14, said hydraulic binder selected from at least one of Portland cement, high alumina cement, blast furnace cement, puzzolane cement, fly ash cement and white cement.

16. An aqueous suspension according to claim 14, component (i) comprising gypsum plaster.

17. A dispersing agent or fluidizer for aqueous suspensions of an effective dispersing or fluidizing amount of a substantially water soluble linear copolymer of monomeric units selected from vinyl acetate and vinyl alcohol with monomeric units of N-substituted maleamic acids in a molar ratio of 1:1, said copolymer represented by Formula (A)

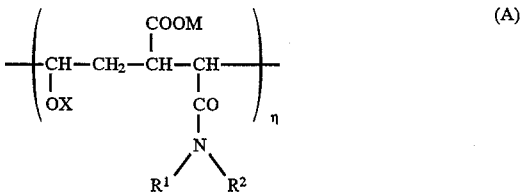
(A)

wherein $R^1$ is hydrogen, $R^2$ is a C1 to C4-alkyl residue which comprises an alkali metal carboxylate or alkaline earth metal carboxylate group, or a hydroxy or amino group, an aromatic residue which comprises carboxylic acid or sulfonic acid groups or alkali metal carboxylate or sulfonate or alkaline earth metal carboxylate or sulfonate groups, or may together with the nitrogen atom to which they bond, form a morpholine ring; X represents a hydrogen atom or the group —$COCH_3$; and M represents a hydrogen atom, a monovalent or divalent metal ion, or a substituted or unsubstituted ammonium group.

* * * * *